US008364598B2

(12) United States Patent
Basmov et al.

(10) Patent No.: US 8,364,598 B2
(45) Date of Patent: Jan. 29, 2013

(54) USE OF SOFTWARE UPDATE POLICIES

(75) Inventors: Innokentiy Basmov, Redmond, WA (US); Troy A. Funk, Issaquah, WA (US); Octavian T. Ureche, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 570 days.

(21) Appl. No.: 12/578,533

(22) Filed: Oct. 13, 2009

(65) Prior Publication Data

US 2011/0088025 A1 Apr. 14, 2011

(51) Int. Cl.
*G06F 21/00* (2006.01)

(52) U.S. Cl. .............. 705/59; 705/902; 726/30; 726/31; 726/32; 726/33; 717/168; 717/174

(58) Field of Classification Search ..................... 705/59
See application file for complete search history.

(56) References Cited

U.S. PATENT DOCUMENTS 7,168,092 B2 1/2007 King et al.
7,363,650 B2 * 4/2008 Moriconi et al. ................. 726/1
7,549,042 B2 6/2009 Glaum et al.
7,565,382 B1 * 7/2009 Sobel .................................. 1/1
2004/0095382 A1 * 5/2004 Fisher et al. .................. 345/744
2005/0278569 A1 * 12/2005 Srinivasan et al. .............. 714/25
2006/0026280 A1 * 2/2006 Sadovsky et al. ............. 709/224
2006/0036845 A1 2/2006 Shu
2006/0085639 A1 4/2006 Phillips et al.
2006/0143475 A1 * 6/2006 Herbert et al. ................ 713/191
2006/0218549 A1 * 9/2006 Hsu et al. ...................... 717/174
2008/0082813 A1 * 4/2008 Chow et al. ....................... 713/2
2008/0098478 A1 * 4/2008 Vaidya et al. ................... 726/24
2008/0162720 A1 * 7/2008 Gulati et al. .................. 709/238
2008/0178169 A1 * 7/2008 Grossner et al. .............. 717/170
2009/0100272 A1 * 4/2009 Smeets ......................... 713/189
2009/0271533 A1 * 10/2009 Asnaashari ..................... 710/13

OTHER PUBLICATIONS

"Windows BitLocker Drive Encryption Step-by-Step Guide", Microsoft TechNet website, all pages, Apr. 30, 2007.*
"What is a portable app?" Portable Apps website, all pages, date unknown.*
"Portable App Support", Portable Apps website, all pages, Sep. 28, 2008.*
"Getting Started with BitLocker Drive Encryption", retrieved at <<http://technet.microsoft.com/en-us/library/dd875544(WS.10).aspx>>, May 22, 2008, pp. 3.
Mihocka, et al., "Virtualization without Direct Execution or Jitting: Designing a Portable Virtual Machine Infrastructure", retrieved at <<http://bochs.sourceforge.net/Virtualization_Without_Hardware_Final.pdf>>, First Workshop on Architectural and Microarchitectural Support for Binary Translation, Jun. 21, 2008, pp. 16.
"VMware ACE 2.0 Release Notes", retrieved at <<http://www.vmware.com/support/ace2/doc/releasenotes_ace2.html>>, Aug. 28, 2008, pp. 5.

* cited by examiner

*Primary Examiner* — James A Reagan
*Assistant Examiner* — Calvin Cheung

(57) ABSTRACT

A portable device may be roamed from one host to another. In one example, the portable device stores software that is to be executed by a host. The host may maintain a policy that governs which software may be executed on the host. When the portable device is connected to a host, the host checks the software version installed on the guest to determine whether that software version is compatible with the host's policy. If the guest's software does not comply with the host's policy, then the host installs a compatible version. If the guest's version complies with the policy and is newer than the host's version, then the host copies the guest's version to the host and propagates it to other guests. In this way, newer versions of software propagate between hosts and guests, while also respecting specific execution policies of the various hosts.

12 Claims, 5 Drawing Sheets

Host 102
Policy 108
Interface 116
Host 104
Policy 110
Interface 118
Host 106
Policy 112
Interface 120
Guest 114
Filesystem 124
Filesystem software 122
Version number 126

USE OF SOFTWARE UPDATE POLICIES

BACKGROUND

Certain types of devices can be communicatively connected to a host computer. For example, a Universal Serial Bus (USB) external hard drive, a USB flash drive, and an MP3 player are examples of devices that can be connected to a computer. When connected, it is possible for the host to read data from the device and/or to execute software stored on the device. Some devices may have software related to the function of a device. For example, an MP3 player might have a device driver that allows the computer to transfer music files between the host and the device. Or, a USB flash drive might have an encrypted volume that stores files, and may also have software that allows the computer to read the encrypted files.

When a host executes software stored on an external device, the safety of the software is an issue. For example, a device could be used to deliver malware to the host that would damage the host in some way. Even if the software on the device can be presumed to be from a benevolent source, the host could have compatibility problems with the software, or the software could have vulnerabilities.

The operators of different hosts may have different assessments of the risks of using a particular piece of software. For example, some hosts may want to use the newest version of software on the theory that the newest version provides the greatest security and has the fewest bugs. Other hosts may want to use a specific older version, since that version may have been tested for compatibility with the host. Some hosts may want to use the newest version of the software, but may not have a copy of the software. In general, there are various differences among hosts in terms of what software they will accept from a portable device.

SUMMARY

The software on a guest device (e.g., a portable memory device, such as a USB hard drive or flash drive) may be updated based on the execution policies of a host. Additionally, if the guest carries a newer version of the software than the host, the guest's version of the software may be copied to the host, if the newer version is consistent with the host's policies. When a host receives newer software from the guest, that host may then propagate the software to other guests.

Guest devices may carry software that enables data on the guest device to be used. For example, a USB flash drive may carry software that allows encrypted files on the drive to be read by a host computer into which the flash drive is inserted. Or, an MP3 player may carry a device driver or music-management software that is to be executed by the host. Software generally comes in different versions. A host may have policies concerning which version of the software the host will allow to execute. Some hosts may want to use the newest version of the software. Other hosts may allow software whose version number is greater than n (for some value of n). Other hosts may call for only a specific version of the software, or software of version n or less (e.g., in the case where old versions have been tested for compatibility with the host environment and newer versions have not been tested for compatibility. When a guest is connected to the host, the host may find the software on the guest device and may check the software for consistency with the host's policies. If the software complies with the host's policies, then the host may execute the software from the guest. If the software does not comply with the host's policies, then the host may copy a compliant version of the software to the guest and then execute that version. Copying a compliant version of the software to the guest may include an upgrade or a downgrade, depending on what version(s) of the software complies with the host's policies. If the guest has a newer version of the software than the host, and if that version complies with the host's policies, then the host may copy the guest's version to the host and may execute the newer version. Once the host has the newer version, the host may copy that newer version of the software to future guests that come into contact with the host, thereby propagating newer software throughout the population of guests.

In one example, the software to be executed is filesystem software that allows the host to read an encrypted volume of files on the guest. For example, the Microsoft BitLocker system provides volume encryption. In order to extend encryption capability from a computer to a portable guest device such as a flash drive, a product called BitLocker To Go Reader allows encrypted files on a guest device to be read by the host under certain circumstances. BitLocker To Go Reader may come in various versions due to the existence of updates. One host may want the newest version, while other hosts may want an older version that the host's administrator has tested for compatibility. Thus, when the guest is attached to a particular host, that host may update the BitLocker To Go Reader software with the version called for by the host's policy. When the same guest is later attached to another host, that host may determine that the newer version does not comply with the host's policy, and may downgrade the guest's software to a prior version. Once the guest has a version of the software that complies with the host's policy, the software may be used to read encrypted files on the guest.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
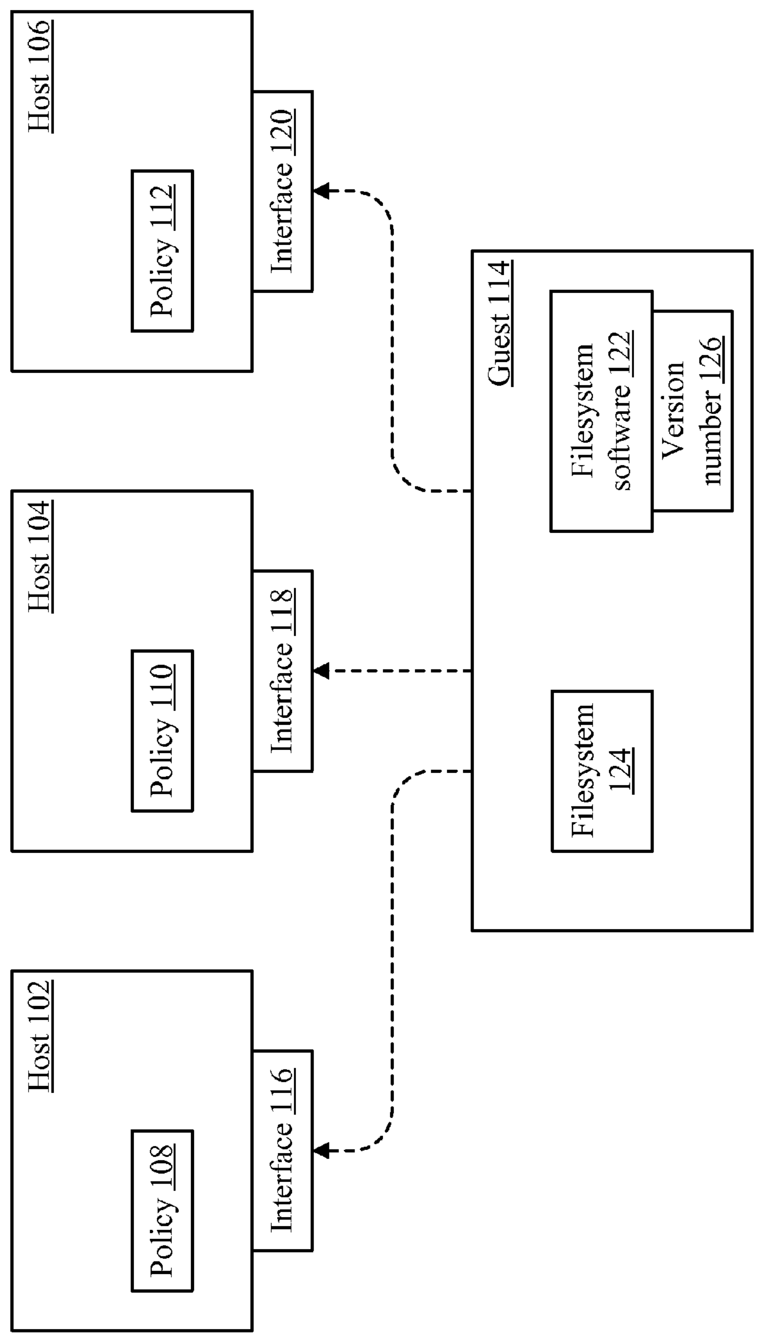
FIG. 1 is a block diagram of an example scenario in which a guest may be roamed to various hosts.

There are various devices that can be communicatively coupled to a computer. For example, external hard disk drives, flash drives, MP3 players, and other devices, can be attached to a computer through a Universal Serial Bus (USB) port. Many such devices carry software that can be executed by a computer. For example, an external hard drive may carry driver software that allows the computer to operate the device. Another example of software that may be carried by a device is file encryption software. One example of such file encryption software is the Microsoft BitLocker To Go Reader software. Microsoft BitLocker drive encryption is a system that encrypts a drive volume. The BitLocker software allows a volume to be encrypted on a portable device, and the BitLocker To Go Reader software allows computer to which the device is coupled to decrypt and use the volume. The Bit- Locker To Go Reader application is implemented in software that is carried by the device. When the device is attached to a host computer, the software is loaded onto, and executed by, the host computer. That software allows the host computer to use the encrypted volume. (Attaching a portable device to a host may be referred to as "roaming" the device to the host.)

Various issues arise anytime a host computer executes software received from a portable device (referred to here as the "guest", or the "guest device"). The software could have compatibility problems with the host device, or with the environment present at the host device. Also, the software could present security risks to the host device. In one example, a guest could carry malware that intentionally attacks the host device. However, even if the software on the guest comes from a known, reputable manufacturer, the software could have vulnerabilities that can be exploited to compromise the security of the host system. Thus, administrators of hosts may want to control and limit the software that they will allow to execute on their systems.

When hosts impose limits on what software they will allow to execute, the use of guest devices that can be attached to the hosts presents a problem. A given guest can be attached, at different times, to several different hosts, whose policies on the use of software may be incompatible with each other. Guest devices may even carry their own policies. One problem that can arise when different hosts have different policies arises in the context of updates. For example, the file encryption software mentioned above may come in several versions (e.g., versions 1-5). Version 5 may be the latest version providing the greatest security, so one company might want its machines only to execute version 5. Another company may have tested only up to version 4 for compatibility with the environment installed on its computers, and thus may have a policy that only version 4 may execute. The guest may have a policy that allows any version numbered 3 or higher to be used.

The subject matter described herein allows a guest device to be used on several different hosts, even if the hosts have different policies regarding what software the different hosts will allow. Software is initially loaded onto a guest, typically by a first host. For example, the first host may have a policy that calls for the use of a particular version of the software, and that version of the software may be loaded initially onto the guest. When the guest is roamed to a second host, the second host determines whether to execute the version of the software that the guest has, or to update the guest's software. This decision may be based on the second host's policy. If the guest is then later roamed back to the first host, then the first host has to decide if the version of the software on the guest is consistent with the first host's policy. The first host might want a less recent version of the software (e.g., if older versions are known to be stable and have been tested for compatibility). Or, the first host might be unaware that there was a newer version of the software, and may want to update its own version of the software using the updated version that the guest received from the second host. In general, when a guest is roamed to a host, the host decides, based on policy, if it will (a) execute the software stored on the guest, (b) replace the guest's software with some other software, and/or (c) replace its own software with the software stored on a guest.

Although the subject matter herein may be used with any kind of software that can be stored on a guest or host, in one example the software in question is file-encryption software. For example, as mentioned above the Microsoft BitLocker system encrypts files, and the BitLocker To Go Reader software allows the encrypted files, when stored on a portable device, to be used on host systems to which the portable device is roamed. The BitLocker To Go Reader software is stored on the guest. Like other commercial software, BitLocker To Go Reader is continually being updated with newer versions. A first host may want to use the newest version. A second host may allow any version of the software to be used, but may not be aware of the newest version. A third host may want to use an older version of the software—e.g., if that older version has been tested and has been found to be compatible in the host's environment. When the guest is roamed to the first host, that host may update the guest to the newest version of the BitLock-To-Go software. The first host may then use the BitLocker To Go Reader software to access the encrypted files on the guest. If the guest is then roamed to the second host, the second host may replace its own copy of the BitLocker To Go Reader software with the newer version that is now on the guest. If the guest is then roamed to the third host, the third host may replace the newest version of the software currently stored on the guest with the older version that the third host finds acceptable. Any variation on these types of events is possible.

Turning now to the drawings, FIG. 1 shows an example scenario in which a guest may be roamed to various hosts. In the example of FIG. 1, there are a plurality of hosts 102, 104, and 106. Each of the hosts has a policy that governs what software can execute on that particular host. Thus, host 102 has policy 108; host 104 has policy 110, and host 106 has policy 112.

Guest 114 is a portable device that may be roamed to any of the hosts 102-106 (or to other hosts). Guest 114 may be, for example, a USB hard disk drive, a USB flash drive, an MP3 player, or any other type of device. Each of hosts 102-106 has an interface through which guest 114 is connectable to the hosts, and through which guest 114 may be brought into communication with the hosts. Hosts 102, 104, and 106 have interfaces 116, 118, and 120, respectively. Each of the interfaces may, for example, be a USB interface, although the subject matter herein includes any appropriate type of interface.

As noted above, guest 114 may store any type of software item, and each of hosts 102-106 may (in accordance with their respective policies) execute the software stored on guest 114. However, in one specific example (which is shown in FIG. 1, but which is not exhaustive of the subject matter herein), guest 114 stores filesystem software 122, which allows access to filesystem 124. For example, filesystem 124 may be an encrypted file system, and filesystem software 122 may be a software package (e.g., the BitLocker To Go Reader software) that allows a host to use encrypted files in filesystem 124.

Filesystem software 122 may have a version number 126. Filesystem software 122 may be released and/or updated in various different versions, and version number 126 indicates which version a particular instances of filesystem software 122 happens to be. When guest 114 is roamed to any of hosts 102-106, the host will either execute filesystem software 122 in order to use filesystem 124. Or, as described above, the host may have a particular version of filesystem software 122 that the host wants to use, and the host may attempt to replace the guest's version of filesystem software 122 with the host's version. (Or, as noted above, the host may want the newest version of filesystem software 122 and may find that the guest has a newer version than the host, in which case the host may replace its own version with the guest's version.) The policy on each host (e.g., policies 108-112) determine which version of filesystem software 122 a particular host will use.

Figure 2:
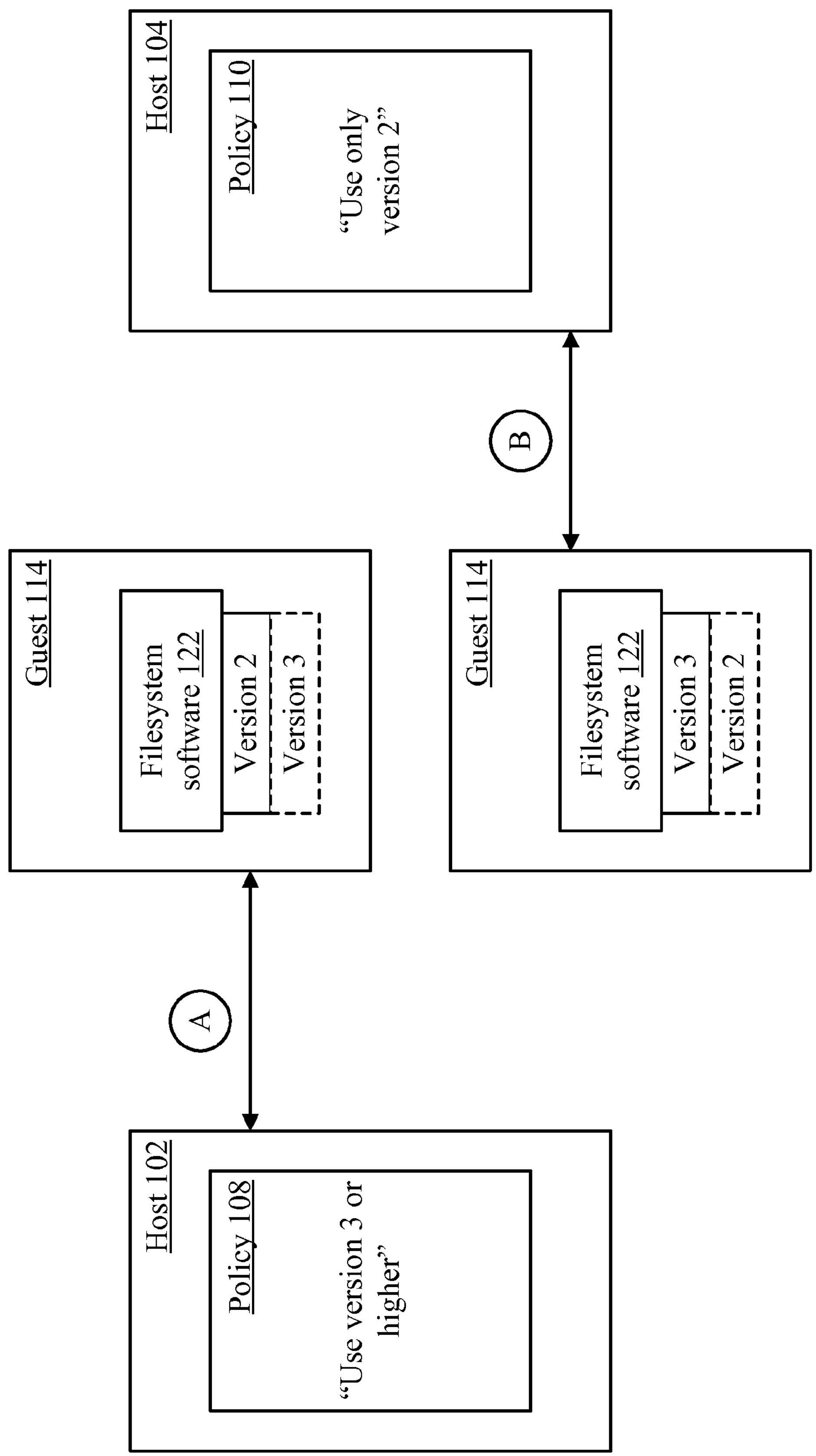
FIG. 2 is a block diagram of an example in which a guest is roamed to a plurality of hosts.

FIG. 2 shows an example in which a guest is roamed to a plurality of hosts. FIG. 2 shows two of the hosts that are shown in FIG. 1 (hosts 102 and 104), although a guest could be roamed to any number of hosts. In the example of FIG. 2, guest 114 is roamed to hosts 102 and 104 in sequence (as indicated by the circled letters A and B).

Initially, guest 114 has version 2 of filesystem software 122 (as shown in the instance of guest 114 that appears toward the top of FIG. 2). As noted above, filesystem software 122 may be software that allows a host to read a filesystem (such as an encrypted filesystem) stored on guest 114. At some point after version 2 of filesystem software 122 is stored on guest 114, guest 114 is roamed to host 102. Roaming guest 114 to host 102 may be performed, for example, by inserting guest 114 into a USB port (or other interface) of host 102.

Policy 108 governs the use of software on host 102. Thus, before host 102 allows the filesystem software 122 on guest 114 to execute, host 102 determines whether the version of that software on guest 114 conforms to the policy of host 102. Policy 108 calls for the use of version 3 or higher. Thus, host 102 updates guest 114 to version 3, and then executes version 3 to access files stored on guest 114. (In one example, host 102 executes a copy of version 3 that is already stored on host 102. In another example, host 102 updates guest 114 to version 3 and then executes filesystem software 122 from guest 114's (newly updated) copy. In practice, as long as host 102 executes a copy of filesystem software 122 that conforms to host 102's policy, it makes no difference whether host 102 executes a copy stored on guest 114 or a copy stored on host 102.)

In the example shown, guest 114 starts with version 2 of filesystem software 122, and thus host 102 updates guest 114 to version 3. In another example, guest 114 might have started with version 4 of filesystem software 122. If guest 114 had version 4, then host 102 might have determined that it was host 102, rather than guest 114, that was to be updated. In particular, if host 102 had version 3 of the software while guest 114 had version 4 of the software, then host 102's policy (which permits the use of any version numbered 3 or higher) would have allowed the use of version 4, and host 102 might have chosen to copy version 4 from guest 114 to itself. Host 102 would then be able to use version 4 to update any future guests that were roamed to host 102.

Returning, however, to the example that is shown in FIG. 2, guest 114 receives an update to version 3 (as indicated by the words "version 3" inside the dashed box in the instance of guest 114 that appears toward the top of the figure).

At some future point in time, guest 114 is roamed to host 104. (The circled "B" over the arrow connecting guest 114 and host 104 indicates that the roaming of guest 114 to host 104 occurs later in time than the roaming of guest 114 to host 102.) At the time that guest 114 is roamed to host 104, guest 114 has version 3 of filesystem software 122 (as indicated by the words "version 3" inside solid lines in the instance of guest 114 that appears toward the bottom of FIG. 2). Policy 110 governs the use of software at host 104, and that policy calls for only version 2 of filesystem software 122 to be used. Thus, host 104 examines the software on guest 114 and determines that guest 114 is using a version that is not permitted under policy 110. Host 104 thus restores version 2 of the software on guest 114 (as indicated by the words "version 2" surrounded by a dashed box). Host 104 then uses version 2 of the software to access the filesystem that is stored on guest 114.

Figure 3:
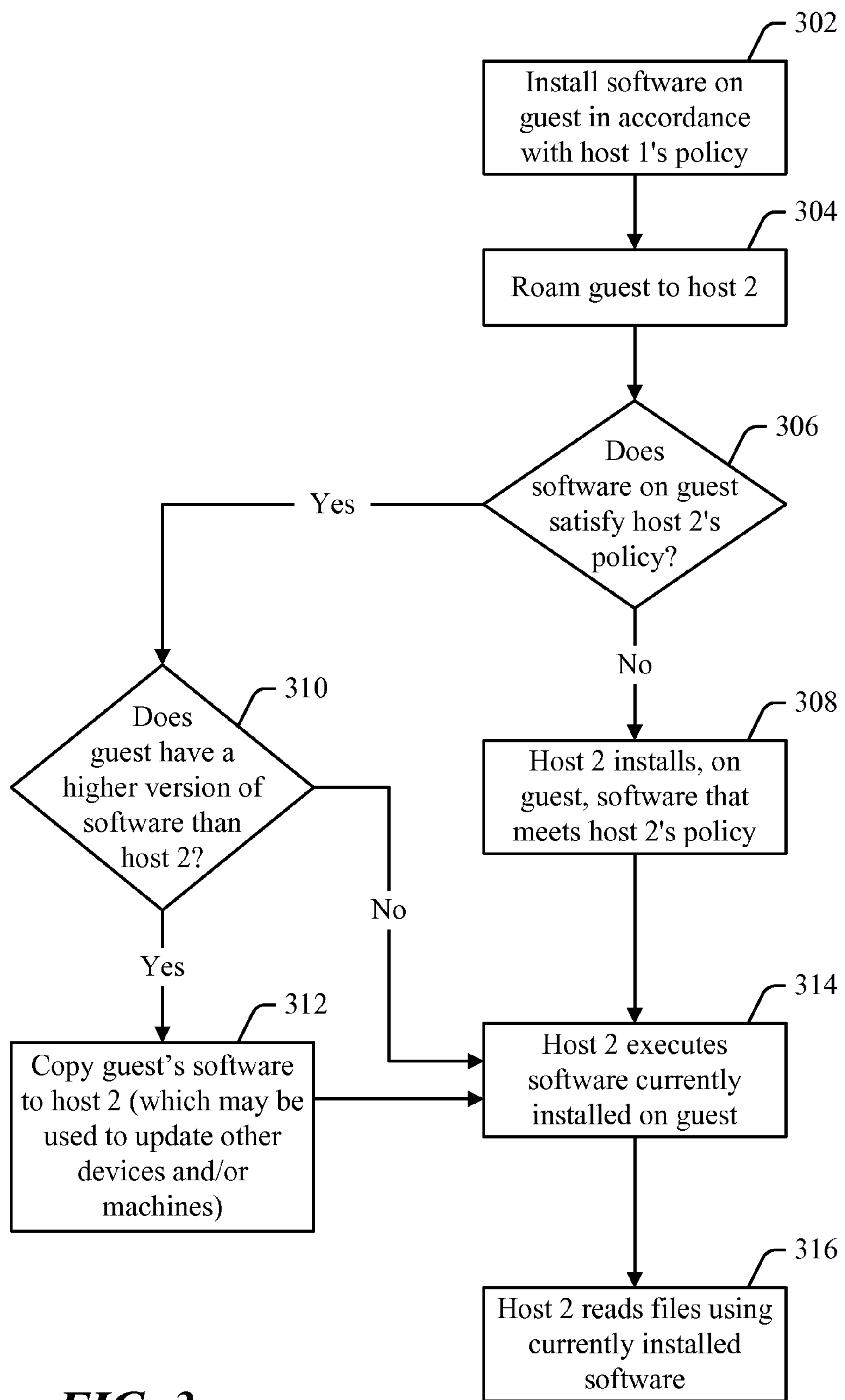
FIGS. 3-4 are flow diagrams of example processes in which a guest is roamed between two hosts.
Figure 4:
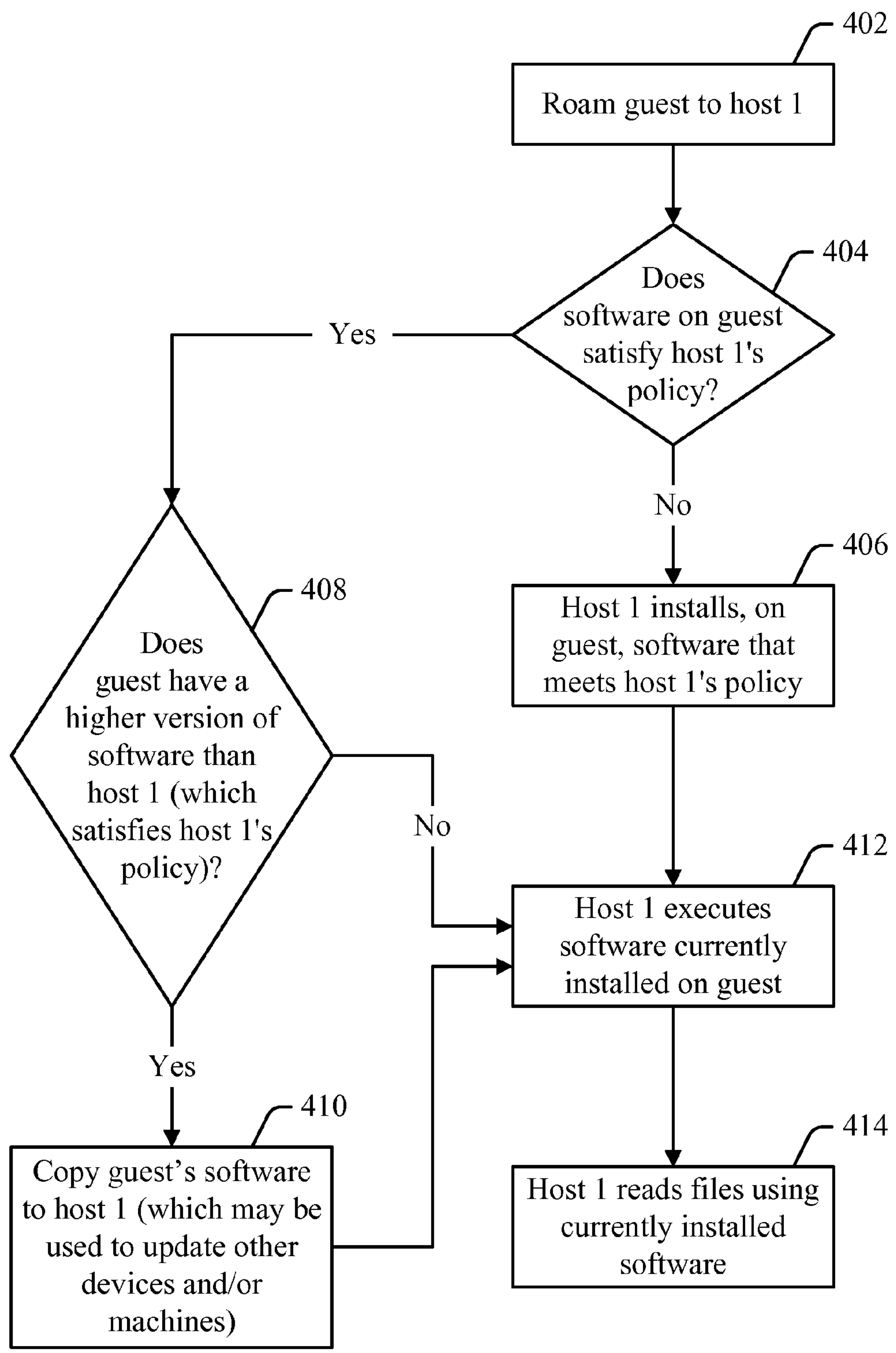

FIGS. 3 and 4 show example processes in which a guest is roamed between two hosts. Before turning to a description of FIGS. 3-4, it is noted that the flow diagrams contained herein are described, by way of example, with reference to components shown in FIGS. 1-2, although these processes may be carried out in any system and are not limited to the scenarios shown in FIGS. 1-2. Additionally, each of the flow diagrams in FIGS. 3-4 shows an example in which stages of a process are carried out in a particular order, as indicated by the lines connecting the blocks, but the various stages shown in these diagrams can be performed in any order, or in any combination or sub-combination.

In FIGS. 3 and 4, it is assumed that there are two hosts, referred to as "host 1" and "host 2." Moreover, it is assumed that host 1 provides the initial software and data to the guest, and that the guest is subsequently roamed to host 2, and then later back to host 1. Thus, at 302 software is installed on the guest in accordance with host 1's policies. For example, if host 1 calls for version 2 of a particular piece of software to be used (e.g., the filesystem software mentioned in the preceding examples), then host 1 installs version 2 of this software on the guest.

At 304, the guest is roamed to host 2 (which is some machine other than host 1). When the guest is attached to host 2 through the appropriate interface (e.g., a USB interface), host 2 may detect that the guest has been connected to the host. In response to detecting that the guest has been connected to host 2, host 2 may find any software on the guest that is to be run. For example, there may be an auto-run procedure whereby the host looks for software in a certain place on a guest whenever a guest is attached to the host. In the case where the guest exists to provide files to a host, the auto-run software may be the filesystem software mentioned above.

When the appropriate software has been identified, host 2 checks whether the software meets the policy of host 2 (at 306). As noted above, host 2 may have policies that specify what software (or what versions of software) may be run on host 2. For example, the guest might have software that is too old (or too new) to run on host 2 under host 2's policy. If the software does not satisfy the policy, then, at 308, host 2 installs, on the guest, software that meets host 2's policy. (When installing software on the guest, host 2 may set a bit on the guest when installation has begun, and may reset the bit when the installation is complete. That way, if the installation fails before it has completed, the fact that installation was aborted may be detected the next time the guest is attached to a host by examining the bit, in which case installation may be restarted.) If the software that was already installed on the guest does satisfy the policy, then host 2 determines whether the guest has a higher version of the software than host 2 does (at 310). If the guest has a higher version of the software than host 2 (and if host 2's policy permits that higher version to be used), then host 2 copies the guest version of the software to itself (at 312). Once host 2 has the newer version of the software, host 2 may then distribute the software to other guests that come into contact with host 2. (In this way, newer versions of software may propagate through host/guest interactions.)

After the newer version of the software is copied to host 2 (at 312), or after the guest is found not to contain a newer version of the software (at 310), the process continues to 314, where host 2 executes the software installed on the guest. That software may be the software that was installed on the guest at the time that the guest was attached to host 2, or it may be software that was installed on the guest by the host as a result of an update.

Using the software, host 2 may then perform some tangible action. For example, in the case where the software is filesystem software that allows the use of encrypted files, host 2 may use the software to read and use the files (at 316).

FIG. 4 shows what may happen when the guest is roamed back to host 1 (at 402). After the guest has been connected to host 1, host 1 determines whether the software on the guest satisfies the policy of host 1 (at 404). It will be recalled that the guest—having been roamed to host 2—may have a version of software that satisfies host 2's policy but not host 1's. Thus, host 2 determines whether the version of software on the guest satisfies host 1's policy. If the software on the guest does not satisfy host 1's policy, then host 1 installs, on the guest, software that meets host 1's policy (at 406). For example, as mentioned above, host 1 may have a policy that calls for version 2 to be used, but host 2 may call for version 3 or higher to be used. Thus, after roaming the guest to host 2, the guest may have version 3 of the software. In that case, host 1 installs a version of the software on the guest that satisfies host 1's policy (at 406). If, on the other hand, the software on the guest satisfies host 1's policy (as determined at 404), then host 1 determines (at 408) whether the guest has a version of the software that is higher than that of host 1, but that also satisfies host 1's policy. (In the specific example where host 1 calls for version 2, and only version 2, of the software, it would not be possible for the guest to have a compliant version with a higher version number. However, host 1 could have a different policy than in the example of FIG. 4, in which case the guest might have a higher version of the software than host 1 has, which also happens to comply with host 1's policy.)

If the guest has a compliant version of the software that is newer than the version on host 1, then host 1 copies the guest's version of the software to host 1 (at 410).

Block 412 is reached by one of the paths shown in FIG. 4. Once block 412 is reached, host 1 executes the software that is currently installed on the guest. That software might be the original software that the guest had when the guest was connected to host 1, or might be a version of the software that host 1 installed on the guest (depending on the various decision points described above). Host 1 then uses the software in some tangible manner. In one example, the software is file-system software that allows host 1 to read encrypted files stored on the guest. In this case, host 1 uses the currently installed version of the software to read files that are stored on the guest (at 414).

Figure 5:
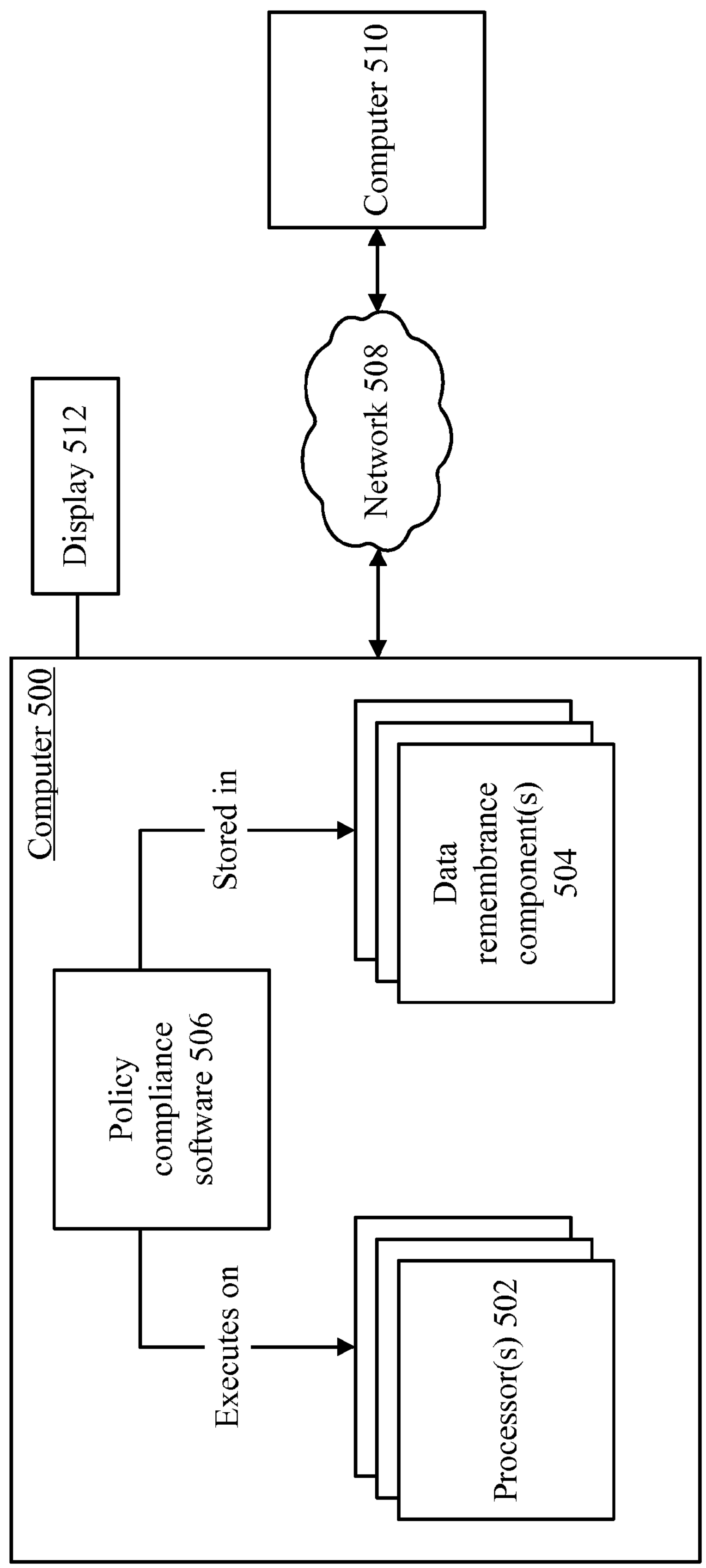
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is policy compliance software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. (Tangible media, such as an optical disks or magnetic disks, are examples of storage media.) Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of using a compliant version of software on a first host, the method comprising:

using a processor to perform acts comprising:

receiving a communication connection from a guest device that stores a first version of a software item;

checking whether said first version of said software item complies with a first policy on said first host;

determining that said software item is of a more recent version than said first policy allows;

copying a second version of said software item from said first host to said guest device;

executing, on said first host, said second version of said software item; and using said second version of said software item to perform a tangible action;

said first version of said software item being stored on said guest device by a second host that is governed by a second policy, and said first policy calling for a version of said software item that is not compatible with said second policy to be used on said first host; and the method further comprising:

connecting said guest device to said second host after said guest device has been in communication with said first host; and restoring said first version of said software item to said guest device.

2. The method of claim 1, wherein an encrypted volume is stored on said guest device, wherein said software item comprises filesystem software that allows hosts to which said guest device is connected to read said encrypted volume, and wherein said tangible action that said second version of said software item is used to perform comprises:

using data from files in said encrypted volume.

3. The method of claim 1, wherein said guest device comprises a flash drive, and wherein said receiving of a connection comprises:

detecting that said flash drive has been inserted into a USB port on said first host.

4. The method of claim 1, wherein said guest device comprises an external hard disk, and wherein said receiving of a connection comprises:

detecting that said external hard disk has been connected to said first host.

5. A computer-readable disk or hardware memory that stores executable instructions for using a compliant version of software on a first host, the executable instructions, when executed by a computer, causing the computer to perform acts comprising:

receiving a communication connection from a guest device that stores a first version of a software item;

checking whether said first version of said software item complies with a first policy on said first host;

determining that said software item is of a more recent version than said first policy allows;

copying a second version of said software item from said first host to said guest device;

executing, on said first host, said second version of said software item; and using said second version of said software item to perform a tangible action;

said first version of said software item being stored on said guest device by a second host that is governed by a second policy, and said first policy calling for a version of said software item that is not compatible with said second policy to be used on said first host; and said acts further comprising:

connecting said guest device to said second host after said guest device has been in communication with said first host; and restoring said first version of said software item to said guest device.

6. The computer-readable disk or hardware memory of claim 5, wherein an encrypted volume is stored on said guest device, wherein said software item comprises filesystem software that allows hosts to which said guest device is connected to read said encrypted volume, and wherein said tangible action that said second version of said software item is used to perform comprises:

using data from files in said encrypted volume.

7. The computer-readable disk or hardware memory of claim 5, wherein said guest device comprises a flash drive, and wherein said receiving of a connection comprises:

detecting that said flash drive has been inserted into a USB port on said first host.

8. The computer-readable disk or hardware memory of claim 5, wherein said guest device comprises an external hard disk, and wherein said receiving of a connection comprises:

detecting that said external hard disk has been connected to said first host.

9. A system for using a compliant version of software on a first host, the system comprising:

a memory;

a processor;

a component that is stored in said memory and that executes on said processor, said component receiving a communication connection from a guest device that stores a first version of a software item;

said component checking whether said first version of said software item complies with a first policy on said first host;

said component determining that said software item is of a more recent version than said first policy allows;

said component copying a second version of said software item from said first host to said guest device;

said component executing, on said first host, said second version of said software item; and said component using said second version of said software item to perform a tangible action;

said first version of said software item being stored on said guest device by a second host that is governed by a second policy, and said first policy calling for a version of said software item that is not compatible with said second policy to be used on said first host; and said component connecting said guest device to said second host after said guest device has been in communication with said first host; and said component restoring said first version of said software item to said guest device.

10. The system of claim 9, wherein an encrypted volume is stored on said guest device, wherein said software item comprises filesystem software that allows hosts to which said guest device is connected to read said encrypted volume, and wherein said tangible action that said second version of said software item is used to perform comprises a use of data from files in said encrypted volume.

11. The system of claim 9, wherein said guest device comprises a flash drive, and wherein said component performs said receiving of said communication connection by detecting that said flash drive has been inserted into a USB port on said first host.

12. The system of claim 9, wherein said guest device comprises an external hard disk, and wherein said component performs said receiving of said communication connection by detecting that said external hard disk has been connected to said first host.

* * * * *